United States Patent
Voyatzakis et al.

(10) Patent No.: US 6,773,254 B2
(45) Date of Patent: Aug. 10, 2004

(54) DOUGH PRESS SHELL MOLD FOR PREVENTING DOUGH SHRINKAGE AFTER SHELL FORMATION

(75) Inventors: Andrew D. Voyatzakis, Carlisle, MA (US); George Anthanasiadis, Lexington, MA (US)

(73) Assignee: Somerset Industries, Inc., N. Billerica, MA (US)

( * ) Notice: Subject to any disclaimer, the term of this patent is extended or adjusted under 35 U.S.C. 154(b) by 169 days.

(21) Appl. No.: 10/245,136

(22) Filed: Sep. 17, 2002

(65) Prior Publication Data

US 2004/0009256 A1 Jan. 15, 2004

(51) Int. Cl.⁷ ............................................. A21C 11/00
(52) U.S. Cl. ...................... 425/318; 425/394; 425/404; 425/412; 99/349; 426/496; 426/512
(58) Field of Search ................................ 425/182, 193, 425/318, 394, 404, 412; 99/349; 426/496, 512

(56) References Cited

U.S. PATENT DOCUMENTS

| | | | |
|---|---|---|---|
| 3,697,036 A | * 10/1972 | Kanbar et al. | ................. 249/74 |
| 3,814,005 A | 6/1974 | Widdel | |
| 3,863,020 A | * 1/1975 | Robinson | ..................... 426/513 |
| 4,417,867 A | 11/1983 | Bauer | |
| 4,511,324 A | 4/1985 | Bauer | |
| 5,074,778 A | 12/1991 | Betts, Jr. et al. | |
| 5,417,149 A | 5/1995 | Raio et al. | |
| 5,417,989 A | * 5/1995 | Atwood et al. | ............. 426/496 |
| 5,469,779 A | 11/1995 | Amore et al. | |
| 6,048,191 A | 4/2000 | Beltrami | |
| 6,332,768 B1 | 12/2001 | Raio et al. | |

* cited by examiner

*Primary Examiner*—Robert Davis
*Assistant Examiner*—Tru Khanh T. Nguyen
(74) *Attorney, Agent, or Firm*—Altman & Martin

(57) ABSTRACT

A dough shell mold for use with a dough press having lower and upper platens with opposed working surfaces. The shell mold has a hub integral with or secured to the lower platen and a ring resting on the lower platen with a hole that mates with the hub. The ring includes an annular groove adjacent to the ring perimeter for producing a raised rim on the shell. In a second embodiment, the ring may have an inner ring mating with the hub and an outer ring around the inner ring. The junction of the rings is the annular groove. Another aspect of the present invention is a notch in the shell mold surface between the mold perimeter and annular groove. A spatula is inserted through the notch between the dough and upper platen to put downward pressure on the dough in order to prevent the dough from shrinking after the upper platen is raised.

2 Claims, 3 Drawing Sheets

DOUGH PRESS SHELL MOLD FOR PREVENTING DOUGH SHRINKAGE AFTER SHELL FORMATION

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to restaurant equipment, more particularly, to manual presses for producing shaped shells of dough for pizzas and the like.

2. Description of the Related Art

Dough presses, both manual and automatic, for the purpose of producing pizza shells and the like have been around for a number of years. Examples of such presses are disclosed in U.S. Pat. Nos. 4,417,867, 5,074,778, and 5,469,779. As can be seen from these examples, a typical press for such a purpose has two horizontal platens with opposing working surfaces. One of the platens has an annular groove to form the raised rim of the shell. In the '867 and '778 patents, the annular groove is in the upper platen, and in the '779 patent, the annular groove is in the lower platen. In operation, a ball of dough is placed on the lower platen, and the platens are forced together, causing the dough to flatten and fill in the annular groove. The result is a flat sheet with a raised rim.

One problem with these designs is that, when the platens separate, the elastic nature of dough causes the newly-shaped pizza shell to shrink. If the amount and nature of the shrinkage was predictable, the parameters of the groove could be adjusted to compensate for the shrinkage. However, because the shrinkage is unpredictable, the final shell may not be round. In other case, the shell may be round but of a different size, and that different size is not consistent and repeatable from one shell to the next. Consequently, using a groove that forms a larger shell in anticipation of shrinkage is not a practical solution.

To solve the shrinkage problem, some devices use heat to partially bake the shell before releasing the platens. Unfortunately, some yeasted doughs raise quickly, so this method is not practical. In other cases, the heat creates a crust, which can be undesirable.

Another aspect of presses for making pizza shells and the like is the difficulty and/or expense of being capable of producing shells of different sizes from the same press. Several solutions have been proposed for this problem. Disclosed in U.S. Pat. No. 5,469,779 is a lower platen that is reversible. Each side of the platen produces a shell of a different size. To change sizes, the platen is turned over. If more than two sizes are desired, then two or more platens are needed.

Another solution is disclosed in U.S. Pat. No. 5,417,149, in which pins releasably retain molds of different sizes to the lower platen. The pins are linearly adjustable along the face of the lower platen for different size molds. The upper platen is exchangeable for different size molds. In order to produce shells of a different size, the lower platen pins must be adjusted for the new size and the upper platen must be replaced, both time-consuming tasks.

A third solution is disclosed in U.S. Pat. No. 6,332,768, in which a solid mold is removably latched to the lower platen, where the size of the mold determines the size of the shell inside the raised rim. The dough is pressed onto the mold and flows over the side of the mold to the lower platen. In order to produce shells of a different size, the old mold must be unlatched and removed and a new one installed and latched.

BRIEF SUMMARY OF THE INVENTION

An object of the present invention is to provide a simple way to prevent dough that has been shaped from shrinking due to elasticity.

Another object is to provide a pizza shell mold that is easily changeable or replaceable.

Yet another object is to provide a relatively inexpensive system giving the ability to produce pizza shell of various sizes from a single dough press.

The present invention is a dough shell mold for use as a component of a dough press. A typical dough press includes lower and upper platens with opposed working surfaces and a drive mechanism to drive the platens toward and away from the each other.

One embodiment of the shell mold has two components, a hub and a ring. The hub is secured to or is an integral part of the lower platen and protrudes upwardly therefrom. The ring rests on the lower platen working surface and has a central hole that mates snugly with the hub. Optionally, the hub/hole is keyed so that the ring cannot rotate on the hub or so that it must be installed in a particular orientation. Optionally, the hub is slightly conical so that the ring can be installed more easily.

An annular groove for producing the raised rim of the shell is adjacent to the perimeter of the mold. The shape of the raised rim will depend upon the cross-sectional shape of the annular groove. The groove may be round, as for a round pizza shell, or it may be any other shape.

The second ring embodiment has two concentric rings, an inner ring that mates with the hub and an outer ring that fits around the inner ring. The junction of the rings is the annular groove that forms the raised rim of the shell. By using different outer rings with a standard inner ring, various raised rim configurations can be produced at minimal cost.

Another aspect of the present invention is a notch in the top surface of the ring between the perimeter and the annular groove. The notch allows a spatula or other flat utensil to be inserted between the dough and the upper platen. It has been discovered through experimentation that if pressure downward pressure is put on the dough, prior to and during moving the upper platen away from the shell mold, the tendency of the dough to shrink is overcome, and the shell retains its desired shape and size. The notch is adaptable to other shell molds with a similar configuration Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
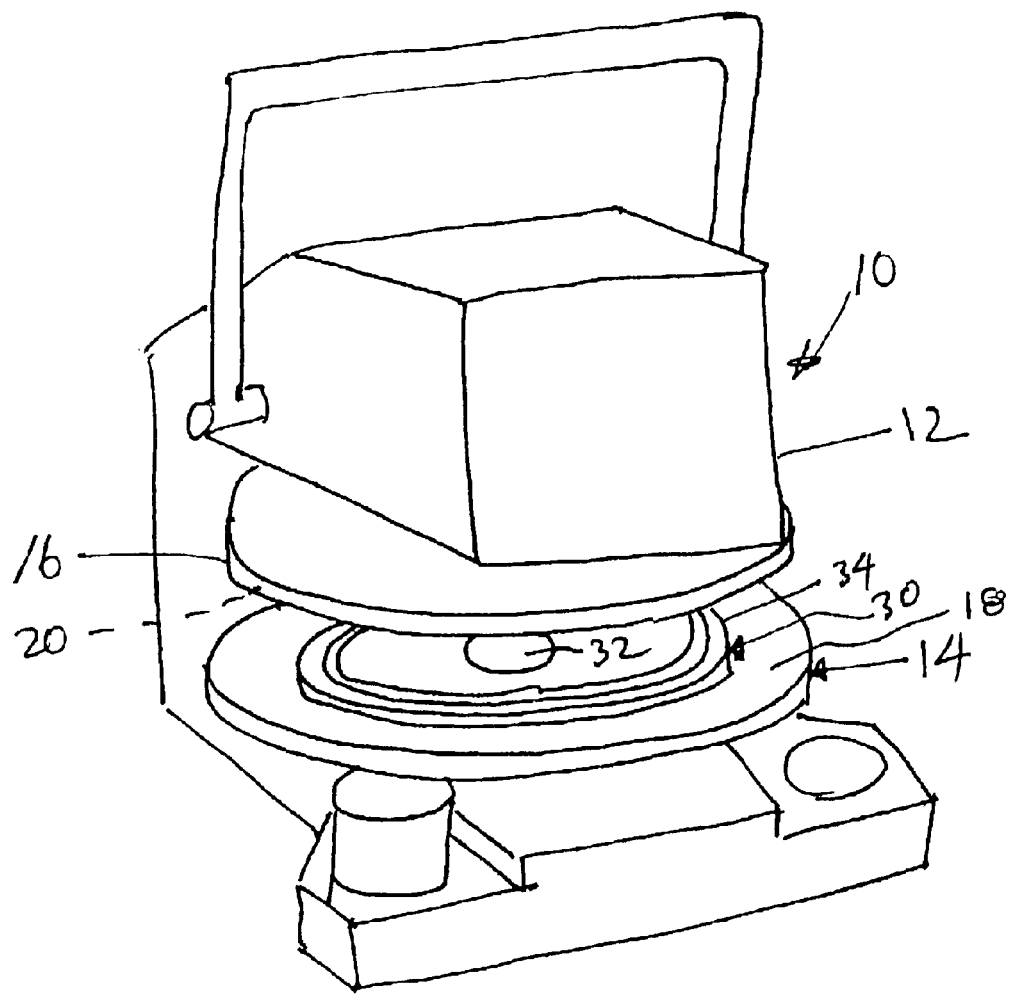
FIG. 1 is a perspective view of a dough press employing the present invention.

The present invention is intended for use as a component of a dough press. A prototypical dough press 10 is shown in FIG. 1. It includes a housing 12 supporting a lower platen 14 with a working surface 18 and an upper platen 16 with a working surface 20. The working surfaces 18, 20 are the opposed surfaces that make contact with the dough being formed. The working surfaces 18, 20 are supported substantially horizontally and substantially in parallel and vertical alignment with each other. The housing 12 includes a drive mechanism whereby the platens 14, 16 are driven toward and away from the each other. Typically, the lower platen 14 remains stationary while the upper platen 16 moves, although the present invention is not limited to this arrangement. The mechanism may be manual or automatic, different types of both of which are well-known in the art.

Figure 2:
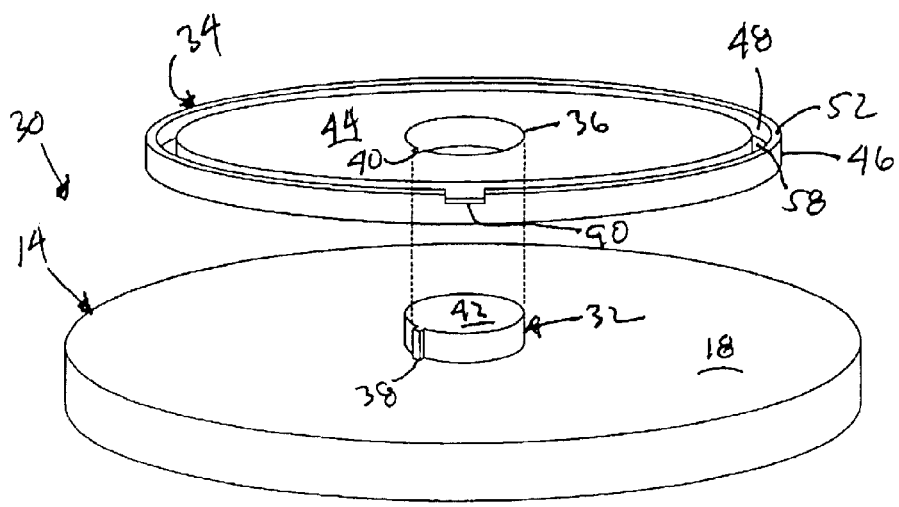
FIG. 2 is an exploded, perspective view of an embodiment of the present invention.
Figure 3:
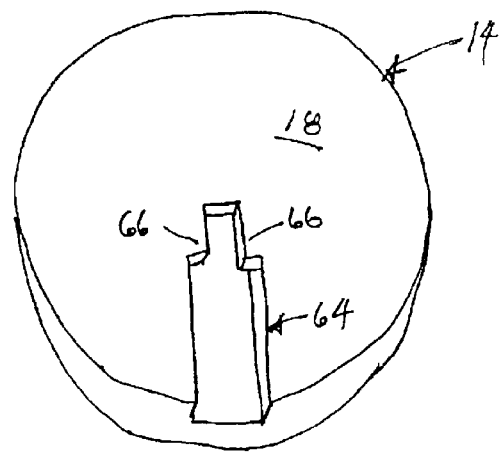
FIG. 3 illustrates the working surface of the lower platen implementing an example mechanism for removably securing the hub to the lower platen.
Figure 4:
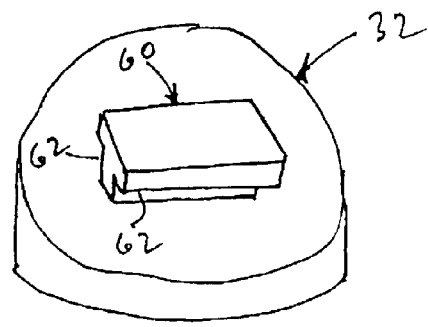
FIG. 4 illustrates the underside of the hub implementing an example mechanism for securing the hub to the lower platen.

The present invention is a dough press mold 30 for producing pizza shells and the like, an embodiment of which is shown in FIG. 2. This embodiment has two components, a hub 32 and a ring 34. The hub 32 is a protruding portion of the lower platen working surface 18. The hub 32 may be integral with the lower platen 14, that is, the hub 32 is formed as part of the lower platen 14. Alternatively, the hub 32 may be independent of the lower platen 14 and secured thereto. In this way, older presses with replaceable shell molds can be retrofitted with the present invention. There are a number of means known in the art for such a securement. For example, the hub 32 can be bolted to the lower platen 14. Alternatively, the hub 32 can be attached as shown in FIGS. 3 and 4. The underside of the hub 32 has a protrusion 60 with side channels 62. The lower platen 14 has radial groove 64 into which the hub protrusion 32 slides. A pair of lips 66 extending over a section of the channel 64 prevents the hub 32 from being pulled perpendicularly from the channel 64 after the hub 32 is seated.

The ring 34 has a central hole 36 that mates snugly with the hub 32 so that the ring 34 fits around the hub 32 while resting on the lower platen working surface 18. In FIG. 2, the hub 32 and hole 36 are shown as round. However, the present invention contemplates that any shape can be used as long as the hub 32 and hole 36 fit snugly. The present invention also contemplates that the hole 36 can be located anywhere on the ring 34 or that there may be more than one hole 36.

Optionally, the round hub 32 and hole 36 are keyed so that the ring 34 is installed in a particular orientation or if it is desired that the ring 34 not rotate about the hub 32. The key can take any of the many forms known in the art. One example is shown in FIG. 2 and consists of a slot 38 in the wall of the hole 36 and a protrusion 40 in the side of the hub 32. The slot 38 is aligned with the protrusion 40 to install the ring 34 on the hub 32.

If the hub 32 and hole 36 are not round, keying is not necessary to prevent the ring 34 from rotating about the hub 32. On the other hand, keying may be needed if the hub 32 must be installed in a particular orientation. For example, if the hub 32 and hole 36 are square, the ring 34 can be installed in any one of four orientations, not all of which may be desirable for a particular application. Alternatively, if the hub 32 and hole 36 are not of a regular shape, for example, trapezoidal, keying is not needed because the ring 34 can only be installed in one orientation.

Optionally, the diameter of the hub 32 is smaller that the top surface 42 than at the working surface 18, that is, a truncated cone, and the ring hole 36 has a complementary shape. The advantage to this configuration is that the ring 34 can be more easily installed. The larger bottom opening of the hole 36 is easier to align with the smaller top of the hub 32. As the hole 36 slides over the hub 32, the ring 34 moves laterally as needed to seat the hole 36 on the hub 32.

When the ring 34 is installed in the hub 32, the top surface 42 of the hub 32 and the top surface 44 of the ring 34 are coplanar so that the formed shell does not have a raised or indented section. If the height of the hub 32 is significantly greater than that of the ring 34, a hole in the shell may be a result. If the height of the hub 32 is significantly less than that of the ring 34, so much of the dough may accumulate in the resulting depression that there is not enough dough to produce the raised rim.

Adjacent to the perimeter 46 of the ring 34 is an annular groove 48. The purpose of the annular groove 48 is to produce the raised rim of the pizza shell. The cross-sectional shape of the annular groove 48 will depend upon the actual application. For example, if a rounded rim is desired, the groove 48 will be generally semicircular in cross-section. If a rounded, flattened rim is desired, the groove 48 may be generally oval in cross-section. The floor 50 of the groove 48 may also be designed for different effects. For example, an undulating floor will result in a wavy effect on the shell rim. It is also possible to simulate a hand-produced shell by designing the surface characteristics of the groove 48 appropriately.

The illustrated embodiments show an annular groove 48 following a circular path. However, the present invention contemplates that the groove 48 may follow a path of any shape. For example, the groove 48 may follow a rectangular or triangular path to produce a rectangular or triangular shell. From a practical or manufacturing viewpoint, the ring 34 would most likely be of the same shape.

A purpose of the present invention is to make producing shells of different sizes and shape easy. Consequently, the present invention contemplates rings 34 with different annular groove shapes and diameters, all having a hole 34 that fits a standard sized hub 32. A set of rings 34 can then be obtained to produce the desired size and shapes of shells.

Optionally, the top surface 52 of the ring 34 between the outer edge 46 and the annular ring 48 is higher than the top surface 44 inside the annular ring 34. The difference in height is the desired thickness of the shell inside the raised rim. With this configuration, the upper platen 12 can be lowered until it touches the ring 34, providing greater consistency and repeatability from one shell to the next.

Figure 5:
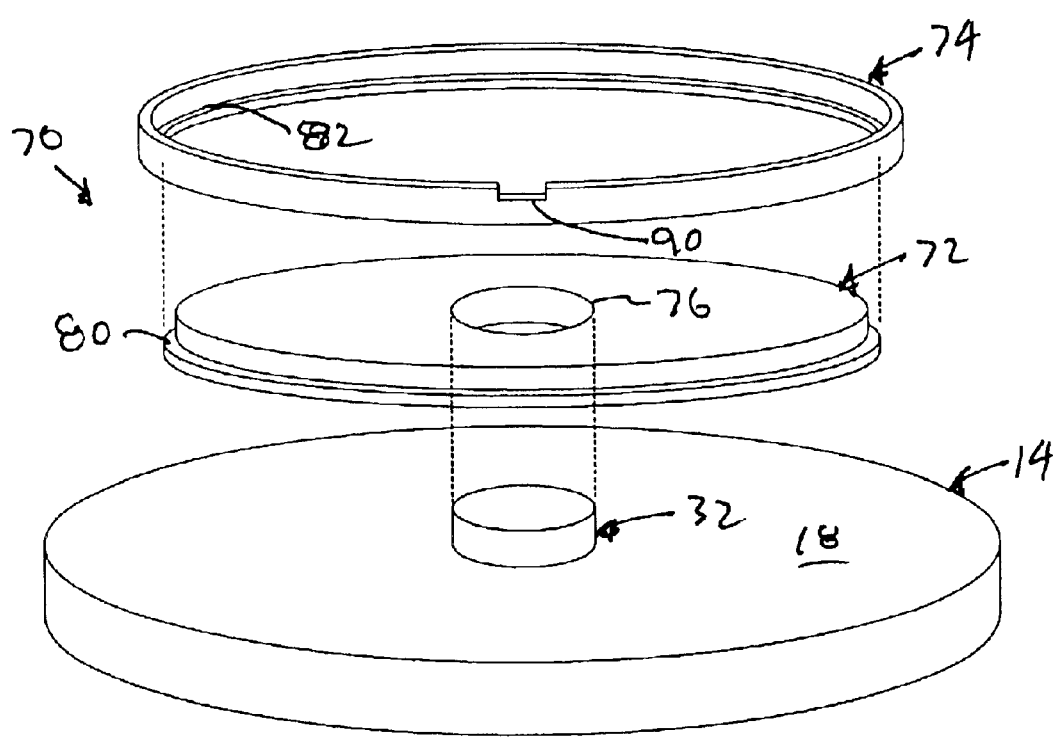
FIG. 5 is an exploded, perspective view of another embodiment of the present invention.

The second ring embodiment 70 is shown in FIG. 5. Rather than the single ring 34 of the embodiment of FIG. 2, there are two concentric rings, an inner ring 72 and an outer ring 74. The inner ring 72 includes a hole 76 that is the same as the hole 36 of the single-ring embodiment 30. When installed on the hub 32, the junction of the inner ring 72 and outer ring 74 create an annular groove similar to the annular groove 48 of the single-ring embodiment 30. The purpose of the two-ring embodiment 70 is provide a method for changing the width of the raised rim of the shell with a minimum of difficulty while lowering the overall cost of the mold. The outer edge 80 of the inner ring has a generally L-shaped cross-section and the inner edge 82 of the outer ring also has a generally L-shaped cross-section. When the both rings 72, 74 are installed, the two L-shaped edges 80, 82 abut to form the annular groove. The two-ring annular groove can have all of the same characteristics described above for the annular groove 48 of the single-ring embodiment.

Another aspect of the present invention is the inclusion of a notch 90 in the top surface 52 of the ring 34 (hereinafter, a reference to the single ring embodiment also applies to the inner/outer ring embodiment) between the outer edge 46 and the annular groove 48. As described above, when the platens 12, 14 separate, the elasticity of the dough tends to cause the shell to shrink. Surprisingly, it has been discovered, through experimentation, that an amount of pressure holding the dough in the annular groove 48 or pinching the dough against the bottom of the annular groove 48 anywhere along the periphery of the ring 34 will prevent shrinkage throughout the entire periphery of the shell. The notch 90 is used to take advantage of this phenomenon by providing an access to the shell between the dough and the upper platen working surface 16 so that downward pressure can be put on the dough at the rim. The current embodiment of the notch 90 is relatively shallow and wide enough to fit a narrow spatula or other similar relatively rigid utensil, that is, a utensil that does not bend so much that it cannot be used to put downward pressure on the dough. The utensil can be metal, plastic, or wood. Preferably, the utensil is slid through the notch 90 and between the upper platen working surface 16 and the dough without piercing the dough.

Although the notch 90 is shown and described in conjunction with the shell molds of the figures, the present invention contemplates that the notch 90 may be incorporated into many prior or future dough presses and molds that utilize an annular groove to form a raised rim. In general, the present invention is a notch in the working surface of a shell mold between the outer edge and annular groove. For example, in the dough press of Amore et al., U.S. Pat. No. 5,469,779, the notch could be formed in the bottom mold from the outer edge to the annular groove. Likewise, in the dough press of Widdel, U.S. Pat. No. 3,814,005, the notch could be formed in the lower disc from the outer edge to the annular groove.

Thus it has been shown and described a pizza shell mold which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A shell mold adapted for use with a dough press for forming a dough shell having a raised rim, said dough press including a lower platen adapted to include said shell mold and an upper platen mounted for movement toward and away from said lower platen, said shell mold comprising:

(a) a working surface having an outer edge;

(b) an annular groove in said working surface spaced from said outer edge; and (c) a notch in said working surface between said outer edge and said annular groove;

(d) whereby, when dough is pressed between said shell mold and said upper platen, a flat utensil is inserted into said notch and between said dough and said upper platen, and said utensil is used to put downward pressure on said dough.

2. A dough press for forming a dough shell having a raised rim comprising:

(a) a housing;

(b) a lower platen attached to said housing and having a shell mold with an outer edge and a working surface, said working surface having an annular groove spaced from said outer edge;

(c) an upper platen attached to said housing, said upper platen having a working surface opposed and substantially parallel to said shell mold working surface;

(d) a drive mechanism for driving said platens toward and away from each other; and (e) a notch in said shell mold working surface between said outer edge and said annular groove;

(f) whereby, when dough is pressed between said lower platen and said upper platen, a flat utensil is inserted into said notch and between said dough and said upper platen, and said utensil is used to put downward pressure on said dough.

* * * * *